(12) United States Patent
Shamshoum et al.

(10) Patent No.: US 6,653,254 B1
(45) Date of Patent: *Nov. 25, 2003

(54) ZIEGLER-NATTA CATALYST WITH METALLOCENE FOR OLEFIN POLYMERIZATION

(75) Inventors: Edwar Shoukri Shamshoum, Houston, TX (US); Hong Chen, Alpharetta, GA (US); Margarito Lopez, Pasadena, TX (US)

(73) Assignee: Fina Technology, INC, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,102

(22) Filed: Feb. 22, 1999

(51) Int. Cl.$^7$ .................. B01J 31/00; B01J 32/00; C08F 4/02; C08F 4/60; C08F 4/44

(52) U.S. Cl. .............. 502/115; 502/113; 502/132; 502/133; 526/114; 526/116

(58) Field of Search ............... 502/113, 115, 502/132, 133; 526/114, 116

(56) References Cited

U.S. PATENT DOCUMENTS

| | | | | |
|---|---|---|---|---|
| 2,992,212 A | * | 7/1961 | De Butts | 260/93.7 |
| 4,659,685 A | * | 4/1987 | Coleman, III et al. | 502/113 |
| 4,701,432 A | * | 10/1987 | Welborn, Jr. | 502/113 |
| 5,032,562 A | * | 7/1991 | Lo et al. | 502/113 |
| 5,077,255 A | * | 12/1991 | Welborn, Jr. | 502/113 |
| 5,155,078 A | * | 10/1992 | Kioka et al. | 502/113 |
| 5,395,810 A | * | 3/1995 | Shamshoum et al. | 502/113 |
| 5,529,965 A | * | 6/1996 | Chang | 502/113 |
| 5,614,456 A | * | 3/1997 | Mink et al. | 502/113 |
| 5,622,906 A | * | 4/1997 | Pettijohn | 502/113 |
| 5,627,117 A | * | 5/1997 | Mukaiyama et al. | 502/113 |
| 5,643,846 A | * | 7/1997 | Reddy et al. | 502/113 |
| 5,648,428 A | * | 7/1997 | Reddy et al. | 502/113 |
| 5,691,264 A | * | 11/1997 | Sacchetti et al. | 502/113 |
| 5,767,031 A | * | 6/1998 | Shamshoum et al. | 502/113 |
| 5,786,433 A | * | 7/1998 | Tomotsu et al. | 502/113 |
| 5,804,524 A | * | 9/1998 | Reddy et al. | 502/113 |
| 5,905,126 A | * | 5/1999 | Tomotsu et al. | 502/113 |
| 6,001,766 A | * | 12/1999 | Kissin et al. | 502/113 |
| 6,013,595 A | * | 1/2000 | Lhost et al. | 502/113 |
| 6,037,296 A | * | 3/2000 | Hsieh et al. | 502/113 |
| 6,051,525 A | * | 4/2000 | Lo et al. | 502/113 |
| 6,214,949 B1 | * | 4/2001 | Reddy et al. | 526/114 |
| 6,339,036 B1 | * | 1/2002 | Jaber | 502/117 |
| 6,403,520 B1 | * | 6/2002 | Hamed et al. | 526/116 |
| 6,417,130 B1 | * | 7/2002 | Mink et al. | 502/113 |

FOREIGN PATENT DOCUMENTS

EP 0747402 12/1996

OTHER PUBLICATIONS

US 2002/0128401 A1, US Pre–Grant publication to Job et al., published Sep. 2002.*

* cited by examiner

Primary Examiner—Mark L. Bell
Assistant Examiner—J. Pasterczyk

(57) ABSTRACT

Provided is a catalyst system for polymerization of monomers having at least one Ziegler-Natta polymerizable bond, comprising:

a) a supported Ziegler-Natta transition metal catalyst having a magnesium component modified with a metallocene catalyst component, such that the ratio of magnesium component to metallocene component is within the range of about 1:1 to about 4:1, during its synthesis or production; and b) an effective co-catalyst.

27 Claims, 3 Drawing Sheets

ZIEGLER-NATTA CATALYST WITH METALLOCENE FOR OLEFIN POLYMERIZATION

FIELD OF THE INVENTION

This invention relates to catalyst system for polymerization of monomer having at least one Ziegler-Natta polymerizable bond. It is notably effective with ethylene and other α-olefins. Particular catalyst systems of this invention will comprise supported Ziegler-Natta catalyst which has been modified with metallocene-type or single-site catalyst, preferably during synthesis.

BACKGROUND OF THE INVENTION

Polyolefin manufacturing processes typically involve the polymerization of olefin monomer with an organometallic catalyst of the Ziegler-Natta type. Catalyst systems for the polymerization of olefins are well known in the art. Typically, these systems include a Ziegler-Natta type polymerization catalyst component and a co-catalyst, usually an organoaluminum compound.

U.S. Pat. No. 4,530,914 discloses use of a catalyst system comprising two or more metallocenes in the polymerization of α-olefins, primarily ethylene, to obtain a broad molecular weight distribution. The metallocenes each have different propagation and termination rate constants. Such metallocenes are mixed with an alumoxane to form the active catalyst system.

U.S. Pat. No. 4,701,432 describes a support treated with at least one metallocene and at least one non-metallocene transition metal compound. To form a catalyst system a cocatalyst comprising an alumoxane and an organometallic compound of Group IA, IIA, IIB, and IIIA is added to the supported metallocene/non-metallocene. The support is a porous solid such as talc or inorganic oxides or resinous materials, preferably an inorganic oxide, such as silica, alumina, silica-alumina, magnesia, titania, or zirconia in finely divided form. By depositing the soluble metallocene on the support material it is converted to a heterogeneous supported catalyst. The transition metal compound, such as $TiCl_4$, is contacted with the support material prior to, after, simultaneously with, or separately from contacting the metallocene with the support.

It is known that $Cp_2TiCl_2$ in the presence of alkylaluminum compounds polymerizes ethylene but not propylene whereas in the presence of methylalumoxane (MAO), $Cp_2TiCl_2$ polymerizes propylene also to produce atactic polypropylene. Combination of dimethyl titanocene and its Cp-substituted analogues and $TiCl_3$ for propylene polymerizations has been reported in U.S. Pat. No. 2,992,212 and by G. A. Lock in "Thermoplastic Elastomers Based on Block Copolymers of Ethylene and Propylene", *Advances in Polyolefins* (Seymour, Raymond B., ed.) at pages 59–74. MAO was not used in this polymerization.

Typically catalysts for traditional polymerization of olefin monomer include a Ziegler-Natta-type polymerization catalyst component, a co-catalyst which is generally an organoaluminum compound, and an external electron donor or selectivity control agent, often an organosilicon compound. Such catalysts are described in U.S. Pat. No. 4,107,413; 4,294,721; 4,439, 40; 4,115,319; 4,220,554; 4,460,701; and 4,562,173.

U.S. Pat. No. Pat. 4,530,914 discloses use of a catalyst system comprising two or more metallocenes in the polymerization of α-olefins, primarily ethylene, to obtain broad molecular weight distribution. Such metallocenes each have different propagation and termination rate constants and are mixed with an alumoxane to form the catalyst system.

U.S. Pat. No. 4,808,561 discloses reacting a metallocene with an alumoxane and forming the reaction product in the presence of a support; a porous material such as talc, inorganic oxides such as those of Groups IIA, IIIA, IVA, or IVB metal oxides such as silica, alumina, silica-alumina, magnesia, titania, zirconia and mixtures thereof, and resinous materials such as polyolefins, particularly finely divided polyethylene.

The disclosures of these patents are hereby incorporated by reference.

A Ziegler-Natta type polymerization catalyst generally is basically a complex derived from a halide of a transition metal, for example, titanium, chromium or vanadium with a metal alkyl, typically an organoaluminum compound, as a co-catalyst. The catalyst is usually comprised of a titanium halide supported on a magnesium compound complexed with an alkylaluminum co-catalyst.

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of α-olefins, primarily ethylene, to obtain a broad molecular weight distribution. The metallocenes each have different propagation and termination rate constants. The metallocenes are mixed with an alumoxane to form the catalyst system. It is also known that metallocenes may be affixed to a support to simulate a heterogeneous catalyst. U.S. Pat. No. 4,808,561 discloses reacting a metallocene with an alumoxane and forming a reaction product in the presence of a support. The support is a porous material like talc, inorganic oxides such as Group IIA, IIIA IVA or IVB metal oxides such as silica, alumina, silica-alumina, magnesia, titania, zirconia and mixtures thereof, and resinous material such as polyolefins, e.g., finely divided polyethylene. The metallocenes and alumoxanes are deposited on the dehydrated support material.

In U.S. Pat. No. 4,701,432 it is taught that a support is treated with at least one metallocene and at least one non-metallocene transition metal compound. To form a catalyst system a cocatalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

It is known that $Cp_2TiCl_2$ in the presence of alkylaluminum compounds polymerizes ethylene but not propylene whereas in the presence of methylalumoxane (MAO) $Cp_2TiCl_2$ polymerizes propylene also to produce atactic polypropylene. Combination of dimethyl titanocene and its Cp-substituted analogues and $TiCl_3$ for propylene polymerizations has been reported in U.S. Pat. No. 2,992,212 and in "Thermoplastic Elastomers Based on Block Copolymers of Ethylene and Propylene", G. A. Lock, *Advances in Polyolefins*, p. 59–74, Raymond B. Seymour, Ed. MAO was not used in this polymerization.

Use exists for improvement of conventional or traditional Ziegler-Natta catalyst activity without the expense and safety concerns of use of pure metallocene-type catalyst systems. Our invention fills this need and alters polymer properties in polymerization processes by use of a supported Ziegler-Natta catalyst which has been modified by metallocene-type catalyst compound.

SUMMARY OF THE INVENTION

Our invention provides means to change polymer properties in polymerization processes using a supported Ziegler-Natta catalyst which has been modified with a metallocene compound.

We further provide means to produce polymerized monomer, particularly polyolefin, having low molecular weight and narrow molecular weight distribution.

Additionally we provide improved catalyst activity by modifying conventional Ziegler-Natta catalyst, preferably during synthesis.

Such provisions are accomplished by catalyst system comprising a supported conventional Ziegler-Natta catalyst modified with a metallocene compound used in polymerization of monomers, notably olefins, especially ethylene.

DETAILED DESCRIPTION OF THE INVENTION

Figure 1:
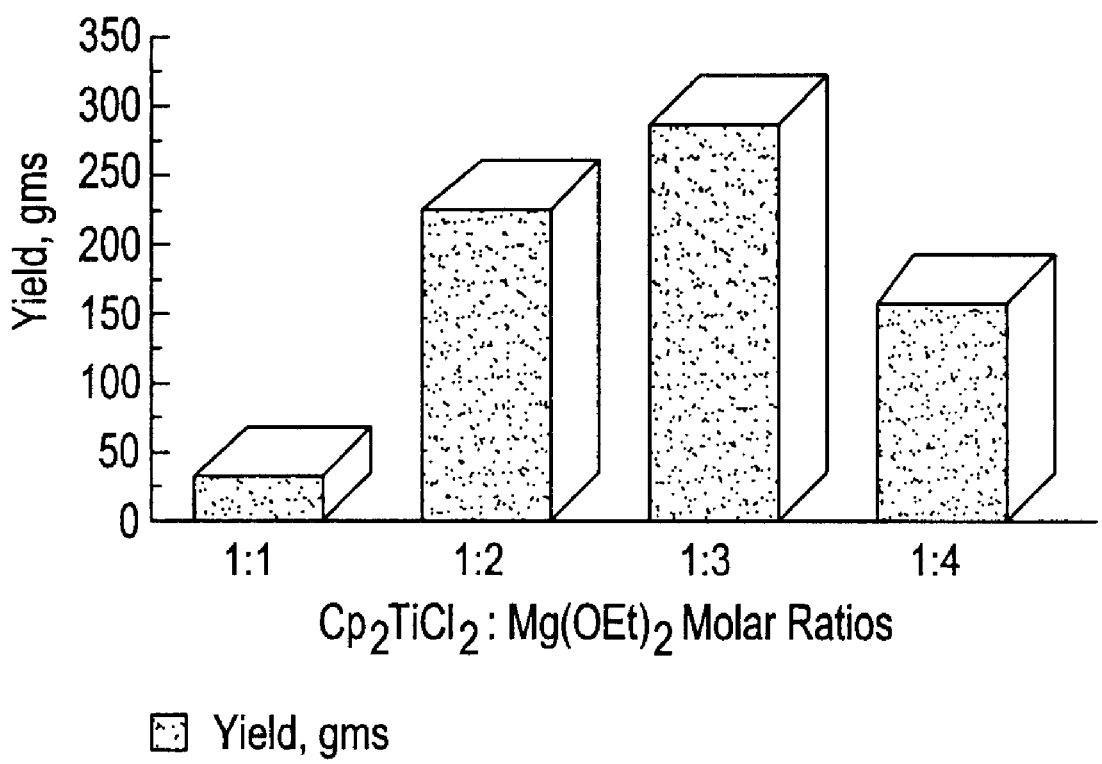
FIG. 1 provides a graphic presentation of $Cp_2TiCl_2$: $Mg(OEt)_2$ molar ratio v. polymer yield.

To assist in clearly defining our invention, it is useful to understand that when the term "metallocene-type catalyst" is used, we intend those catalyst components functioning in a manner similar to metallocenes. We intend also that which is not conventional or traditional Ziegler-Natta catalyst but which will polymerize Z-N-accessible (polymerizable) bond. Examples of such species include the well known bis-cyclopentadienyl ring ligands-bearing transition metal molecules, mono-cyclopentadienyl and heteroatom ligands-bearing molecules; and other known similarly functioning non-Cp, multi-"heteroatom" molecules such as those described in U.S. Pat. No. 5,227,440; U.S. Pat. No. 5,264,405; U.S. Pat. No. 5,318,935; and U.S. Pat. No. 4,774,301 among others. Useful and effective cocatalysts will include organoaluminums such as aluminum alkyls and alumoxanes as well as other activators such as the irreversibly reacting large, labile anions of Hlatky and Turner particularly those described in U.S. Pat. No. 5,470,927; 5,384,299; and 5,198,401; also those of U.S. Pat. No. 5,621,126 and the cationic or cataqlyst component species described here as well.

Our invention provides catalyst system, for polymerization of monomer having at least one Ziegler-Natta polymerizable bond, comprising:
  a) supported conventional Ziegler-Natta type transition metal catalyst component modified with metallocene-type catalyst component during its synthesis or production; and
  b) effective co-catalyst.

In another embodiment, our invention provides process for polymerization of monomer having at least one Ziegler-polymerizable bond comprising steps of:
  a) selecting catalyst system comprising:
    i) supported conventional Ziegler-Natta type transition metal catalyst component modified with metallocene-type catalyst component during its synthesis or production; and
    ii) effective co-catalyst;
  b) selecting monomer to be polymerized;
  c) contacting monomer with catalyst system under suitable conditions of time and temperature to initiate polymerization;
  d) optionally stopping polymerization after brief contact to effect pre-polymerization;
  e) continuing contact of monomer with catalyst system to accomplish desired polymerization; and
  f) separating desired polymer.

Yet another embodiment of our invention provides synthesis of catalyst system, for polymerization of monomer having at least one Ziegler-Natta polymerizable bond, comprising steps of:
  a) selecting component comprising magnesium dialkoxide of the general formula $Mg(OR^2)_2$ where $R^2$ is a hydrocarbyl or substituted hydrocarbyl of 1 to 20 carbon atoms;
  b) combining with metallocene-type catalyst component-supplying agent;
  c) adding halogenating, preferably chlorinating, agent;
  d) adding titanating agent, which may optionally be the same as halogenating agent; and
  e) providing effective cocatalyst.

A further embodiment of our invention provides polymer produced by polymerization of monomer having at least one Ziegler-polymerizable bond in the presence of catalyst component, comprising; supported conventional Ziegler-Natta type transition metal catalyst component modified with metallocene-type catalyst component during its synthesis or production.

For each of the previously described embodiments of our invention, a preferred embodiment uses metallocene-type catalyst component comprises at least one ligand comprising cyclopentadienyl ring structure. Effective cocatalyst includes those which comprise aluminum compound.

A preferred embodiment of the transition metal compound are those of the general formula $MR^1_x$ where the metal, M, is group 4 metal, $R^1$ is halogen or hydrocarbyloxy, and x is the valence state of metal. Further useful catalyst systems will use aluminum compound comprising organoaluminum.

Notably preferred catalyst systems will be those wherein Group 4 metal is titanium, organoaluminum which are aluminum alkyl of the formula $AlR'_3$ where R' is an alkyl having 1–8 carbon atoms, each R' is the same or different, or their combinations.

Polymer product separated upon use of our invention will have generally narrow molecular weight distribution. Ziegler-Natta catalyst usefully may be pre-polymerized to improve the performance of the catalyst. Generally, prepolymerization is effected by contacting a small amount of monomer with the catalyst after the catalyst has been contacted with the co-catalyst. Pre-polymerization is described in U.S. Pat. No. 4,767,735, 4,927,797 and 5,122,583, hereby incorporated by reference.

Any of the conventional supported Ziegler-Natta transition metal compound catalyst components can be used in the present invention. The transition metal compound is preferably of the general formula $MR^1_x$ where M is the metal, $R^1$ is a halogen or a hydrocarbyloxy and x is the valence of the metal. Preferably, M is a Group IVB metal, more preferably a Group IVB, and most preferably titanium. Preferably, $R^1$ is chlorine, bromine, an alkoxy or a phenoxy, more preferably chlorine or ethoxy and most preferably, chlorine. Illustrative examples of the transition metal compounds are $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta catalyst. The support is preferably a magnesium compound. Examples of the magnesium compounds which are to be used to provide a support source for the catalyst component are magnesium halides, dialkoxymagnesiums, alkoxymagnesium halides, dialkylmagnesiums, magnesium oxide, magnesium hydroxide, and carboxylates of magnesium. The preferred magnesium compounds are magnesium halides, notably magnesium chloride.

The organoaluminum co-catalyst is preferably an aluminum alkyl of the formula $AlR\char`^_3$ where $R\char`^$ is an alkyl having one through about eight carbon atoms, each of the alkyl groups may be the same or different. Examples of aluminum alkyls are trimethyl aluminum (TMA), triethyl aluminum (TEAl) and triisobutyl aluminum (TiBAl). The preferred aluminum alkyl is TEAl.

The metallocene compound may be a cyclopentadienide, i.e., a metal derivative of a cyclopentadiene. The metallocene should contain at least one cyclopentadiene ring and be of the general formula:

$$R''_n(CpR_{5-n})_a(CpR'_{5-n})_b M'R^*_{v-(a+b)}$$

where Cp is a cyclopentadienyl ring, R and R' are substituents on the cyclopentadienyl rings and can be a hydride or a hydrocarbyl from 1–9 carbon atoms, each R and R' being the same or different, each $(CpR_{5-n})$ and $(CpR'_{5-n})$ being the same or different, a and b are 0 or 1, indicating whether the particular Cp ring is present, but at least one of a or b must be 1; R" is a structural bridge between $(CpR_{5-n})_a$ and $(CpR'_{5-n})_b$ to impart stereorigidity, n being 1 or 0 to indicate whether the bridge is present or not and when n=1, a and b both must equal 1; M' is Group IVB metal, R* is a hydride, a halogen or a hydrocarbyl from 1–20 carbon atoms, v is the valence of M'. Preferably, a is 1 and b is 1, $(CpR_{5-n})$ and $(CpR'_{5-n})$ are the same and are cyclopentadienyl rings such that they are unsubstituted cyclopentadienyl and n is 0, i.e., unbridged. Preferably, M' is titanium, which have valences of 4. Preferably, R* is a halogen or alkyl, most preferably chlorine. The standard synthesis procedure for prior art conventional Ziegler-Natta catalysts follows:

a) selecting a solid component comprising magnesium dialkoxide of the general formula $Mg(OR^2)_2$ where $R^2$ is a hydrocarbyl or substituted hydrocarbyl of 1 to 20 carbon atoms;

b) adding a chlorinating agent;

c) adding a titanating agent; and d) adding an organoaluminum co-catalyst.

The chlorinating agent and the titanating agent may be the same compound, e.g. a titanium chloride, specifically titanium tetrachloride $(TiCl_4)$ The synthesis procedure for Ziegler-Natta type catalysts for the polymerization of olefins is disclosed in U.S. Patent the disclosures of which are hereby incorporated. The present invention modifies the synthesis procedure, and thus modifies the catalyst, by adding a metallocene compound during the synthesis process. Our synthesis for the catalysts of this invention follows:

a) selecting component comprising magnesium dialkoxide of the general formula $Mg(OR^2)_2$ where $R^2$ is a hydrocarbyl or substituted hydrocarbyl of 1 to 20 carbon atoms, a magnesium diethoxide is usefully applied here;

b) combining with metallocene-type catalyst component-supplying agent;

c) adding halogenating agent;

d) adding "reactive Group 4" agent, titanium tetrachloride functions well for both steps c) and d) here and heating at this point promotes thorough reaction of the components, at which point washing the product with solvent, heptane is notably effective, to purify the product, following with heat treatment again will assist in solvent removal, the product is usefully dried at this point, drying under vacuum will assist in speeding drying; and e) providing effective cocatalyst; organoaluminums, notably triethylaluminum, will function beneficially here.

As shown, metallocene-type catalyst compound was added prior to the addition of titanium tetrachloride. The amount of metallocene added is such that a molar ratio of magnesium dialkoxide/titanocene to (Mg/Ti) is at least 1:1, preferably about 1:1 to about 1:4, more preferably about 1:3.

The invention having been generally described, the following examples are given as particular embodiments of the invention and to demonstrate the practice and advantages thereof. It is understood that the examples are given by way of illustration and are not intended to limit the specification or the claims to follow in any manner.

PREPARATION OF THE CATALYST

Preparation of Catalyst Precursor From Reaction of $Cp_2TiCl_2$ and $Mg(OEt)2$

Unless otherwise stated, all manipulations were conducted under inert atmosphere. $Mg(OEt)_2$ was dried in vacuo at 120° C. for 20 hours. Heptane and toluene were purified by passing through a 3A molecular sieve column, an F200 alumina column and then a column filled with copper catalyst at a rate of 12 ml/min. Octane was dried over sodium metal and distilled prior to use.

For a typical preparation, 20 g $Cp_2TiCl_2$ and a certain amount of $Mg(OEt)_2$ (depending on the desired molar ratio) were weighed into a 500 ml, 3-neck round-bottom flask equipped with a 60 ml dropping funnel and a condenser with a gas inlet in the dry box. The flask was placed in a mineral oil bath and the solid was suspended in 200 ml toluene. The slurry was heated to reflux (oil bath temperature at 120° C.) and stirred overnight (16–21 hours). The color of the reaction mixture turned from red to brown within one hour and, eventfully, to green overnight. The reaction mixture was cooled to 60° C. and allowed to settle. The supernatant was decanted via a cannula and the solid was washed three times with toluene. The final solid was dried in vacuo at 60° C. for two hours. In the case of 4:1 $Mg(OEt)_2$:$Cp_2TiCl_2$ reaction, the settling of the reaction mixture was slow. Therefore, the supernatant was decanted as much as possible and the rest of the slurry was dried in vacuo at 60° C. for two hours. The color of the resultant solid ranged from yellow-green to blue-green depending on the $Mg(OEt)_2$ and $Cp2TiCl_2$ ratio. The lower the ratio, the darker the color of the catalyst precursor.

Reaction With the Group 4 Agent of the Catalyst Precursor

Five grams (g) of the solid made from the reaction above was suspended in 100 ml heptane in a 250 ml flask and heated to reflux. 12 ml TiCl$_4$ was added drop-wise to the stirred suspension over 45 minutes. The reaction mixture was stirred at 980° C. for 5.5 hours, during which time the color of the solid turned brown. The reaction mixture was then cooled to 70° C. and allowed to settle. The supernatant was decanted via a cannula and the solid was washed four times with 50 ml heptane. The solid residue was then re-slurried in 50 ml octane and heated at 120° C. for 18 hours. After the heat treatment, the slurry was cooled to 70° C. and allowed to settle. The supernatant was decanted and the solid was dried in vacuo at 70° C. for two hours. The color of the final catalyst was brown.

(1) Syntheses of the Catalyst Precursor and the Catalysts

A schematic synthesis for each the catalyst precursor, with the metallocene-type modifier, and the actual polymerization catalyst is provided below. The precursor is demonstrates useful results and is preferably produced when the ratio of n/m equals about one through about four.

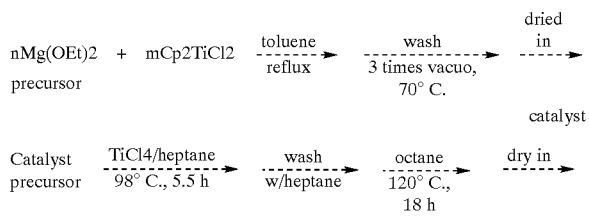

Polymerizations

A four liter reactor fitted with four mixing baffles with two opposed pitch mixing propellers was used for the polymerization of ethylene. Ethylene and hydrogen were introduced to the reactor vessel via mass flow controllers while a dome loaded back-pressure regulator keeps the internal reaction pressure constant. The temperature is maintained in the reactor jacket by steam and cold water using a valve lined to a controller.

Hexane is used as diluent and triethyl aluminum (TEAL) is used as cocatalyst for all polymerizations.

| Polymerization conditions | |
| --- | --- |
| Temperature | 80° C. |
| Reaction Time | 60 minutes |
| Catalyst | 10 mg |
| Cocatalyst | TEAL @ 0.25 mmole/l |
| Flow rates | H$_2$/C$_{2+}$ at about 2–8 SLPM |
| Butene | 0, 200 or 300 cc/min |

Without limiting the scope of the invention or claims, it is believed that metallocene is incorporated into the catalyst chemically by the reaction of Mg(OEt)$_2$ and Cp$_2$TiCl$_2$. During this step, at least part of the Mg(OEt)$_2$ is chlorinated by Cp$_2$TiCl$_2$ to form Mg(OEt)$_x$Cl$_{2-x}$.

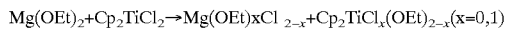

Mg(OEt)$_2$+Cp$_2$TiCl$_2$→Mg(OEt)xCl$_{2-x}$+Cp$_2$TiCl$_x$(OEt)$_{2-x}$(x=0,1)

The chemical exchange between Mg(OEt)$_2$ and Cp$_2$TiCl$_2$ leading to metallocene incorporation is evidenced by the color change of the reaction mixture as well as the composition change as shown in Table 1.

TABLE 1

OEt % and Ti % in Catalyst Precursor and Corresponding Catalyst

| Mg(OEt)$_2$/Cp$_2$TiCl$_2$ | % OET Catalyst Precursor | Catalyst | % Ti Catalyst Precursor | Catalyst |
| --- | --- | --- | --- | --- |
| 1:1 | 15.9 | 3.9 | 9.7 | 11.7 |
| 2:1 | 12.9 | 5.8 | 6.3 | 9.3 |
| 3:1 | 16.1 | 3.1 | 5.2 | 11.1 |
| 4:1 | 31.1 | 2.3 | 5.9 | 11.1 |

The OEt % in the catalyst precursor ranges from 13% to 31%, down from 80% for the starting material Mg(OEt)$_2$, indicating extensive reaction between Mg(OEt)$_2$ and Cp$_2$TiCl$_2$ when the Mg(OEt)$_2$:Cp$_2$TiCl$_2$ ratio increases, OEt % increases, understandably so because of the extent of the reaction. Also, when the Mg(OEt)$_2$ ratio increases, the color of the catalyst precursor changes from blue-green to yellow-green. The higher the Mg(OEt)$_2$:Cp$_2$TiCl$_2$ ratio, the less metallocene is incorporated into the catalyst precursor, and therefore the lighter the color. The catalyst precursor from 1:1 reaction of Mg(OEt)$_2$ and Cp$_2$TiCl$_2$ contains very likely some of the unreacted Cp$_2$TiCl$_2$, which is only partially soluble in toluene and will remain in the catalyst precursor resulting in darker color than the others. The existence of Cp$_2$TiCl$_2$ in the catalyst precursor from 1:1 reaction is also evidenced by the hydrogen response of that catalyst.

Figure 2:
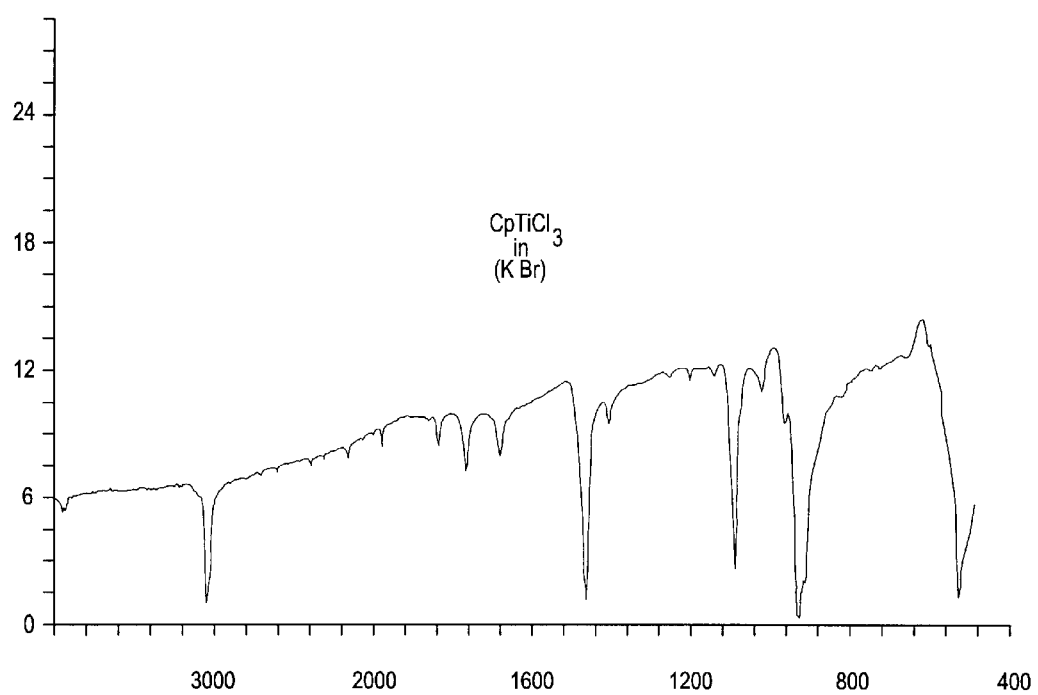
FIGS. 2 and 3 provide infrared (IR) spectra for $Cp_2TiCl_2$, the catalyst precursor, and the catalyst made from 3:1 reaction of $Mg(OEt)_2$ and $Cp_2TiCl_2$, respectively.
Figure 3:
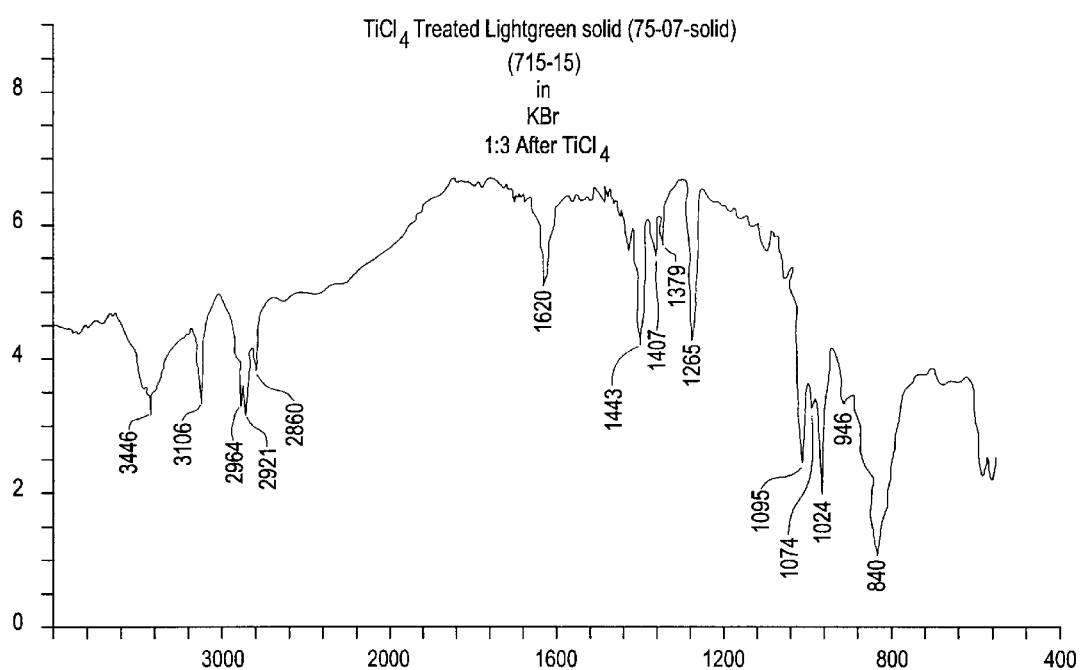

The IR spectra of the catalyst precursor and its corresponding catalyst after titanation also show the evidence of metallocene incorporation into the catalyst matrix. Shown in FIGS. 1–3 are spectra of Cp$_2$TiCl$_2$, the catalyst precursor and the catalyst made from 3:1 reaction of Mg(OEt)$_2$ and Cp$_2$TiCl$_2$. Most characteristic are the bands near 1800, 1900 and 3110 cm$^{-1}$ which are characteristic of the Cp groups from the metallocene.

After reaction with the Group 4 agent, preferably a titanating agent to provide titanation, more ethoxides are removed and more titanium were incorporated into catalyst. Therefore, there is a decrease of OEt % and increase of Ti % from the catalyst precursor to the catalyst.

Table 2 summarizes the polymerization results with the catalysts prepared from various molar ratios of Mg(OEt)$_2$ and Cp$_2$TiCl$_2$. As shown in Table 2, the activity for the catalysts varies significantly with Mg(OEt)$_2$ to Cp$_2$TiCl$_2$ ratio. The catalyst prepared from 3:1 ratio showed the best activity toward ethylene polymerization (26,200 g/gcat/h), while the productivity of the catalyst prepared from 2:1 ratio (20,900 g/cat/h) from also demonstrated good activity. The catalyst precursor itself is not active toward ethylene polymerization.

The hydrogen response for the catalysts also varies with Mg(OEt)$_2$ to Cp$_2$TiCl$_2$ ratio. The hydrogen response of the catalyst increases with the decrease of the Mg(OEt)$_2$:Cp$_2$TiCl$_2$ ratio, with the exception of the 1:1 ratio catalyst. The poor hydrogen response of the catalyst prepared from 1:1 ratio is probably due to the residual Cp$_2$TiCl$_2$ in the catalyst. Because the relative amount of Cp$_2$TiCl$_2$ for the reaction to make the catalyst precursor is the highest among the four catalysts, and because Cp$_2$TiCl$_2$ is only partially soluble in toluene, some of the unreacted Cp$_2$TiCl$_2$ remained in the catalyst precursor during the washes and eventually in the final catalyst. We have learned from other study that the addition of metallocene can dramatically decrease the hydrogen response of typical catalyst, possibly related to hydrogenation activity of metallocene.

The molecular weight distribution for polymers made with the catalysts becomes narrower when the ratio between Mg(OEt)$_2$ and Cp$_2$TiCl$_2$ decreases. Polymers made from the catalyst prepared form 2:1 ratio and the catalyst prepared from 3:1 ratio seem to have very similar properties in terms of melt flow index and molecular weight distribution.

TABLE 2

| Mg/Cp ratio | Yield (g) | B.D. (g/cc) | M15 | HLMI | DENS | D | D' |
|---|---|---|---|---|---|---|---|
| 1 | 35 | 0.29 | 0.178 | 2.22 | 0.9505 | 4.8 | 3.9 |
| 2 | 209 | 0.26 | 4.40 | 45.89 | 0.9594 | 5.5 | 4.9 |
| 3 | 262 | 0.29 | 4.03 | 44.06 | 0.9595 | 5.8 | 5.4 |
| 4 | 157 | 0.32 | 1.16 | 8.68 | 0.9582 | 7.3 | 5.3 |

A new approach to prepare Ziegler-Natta type catalysts involves the treatment of magnesium ethoxide with titanocene dichloride prior to TiCl$_4$ treatment. Different reactant ratios resulted in different catalyst activity and polymer properties. Preliminary screening of these catalysts showed excellent catalyst activity and hydrogen response for some catalysts. Generally, hydrogen response of these new catalysts is good while molecular weight distribution seems to be narrow.

Clearly, numerous modifications and variations of the present invention are possible in light of the above teachings. It is therefore to be understood that within the scope of the appended claims, the invention may be practiced otherwise than as specifically described herein.

We claim:

1. A catalyst system, for polymerization of monomers having at least one Ziegler-Natta polymerizable bond comprising:
   a) a supported Ziegler-Natta transition metal catalyst comprising a magnesium dialkoxide modified with a metallocene catalyst component, such that the molar ratio of magnesium dialkoxide to metallocene component is within the range of about 1:1 to about 4:1, during synthesis or production; and
   b) an effective co-catalyst.

2. A process for polymerization of monomers having at least one Ziegler-Natta polymerizable bond, comprising steps of:
   a) selecting a catalyst system comprising:
      i) a supported Ziegler-Natta transition metal catalyst comprising a magnesium dialkoxide modified with a metallocene catalyst component, such that the molar ratio of magnesium dialkoxide to metallocene component is within the range of about 1:1 to about 4:1, during its synthesis or production; and
      (ii) an effective co-catalyst;
   b) selecting monomers to be polymerized;
   c) contacting the monomers with the catalyst system under suitable conditions of time and temperature to initiate polymerization;
   d) optionally stopping polymerization after brief contact to effect pre-polymerization;
   e) continuing contact of the monomers with the catalyst system to accomplish desired polymerization; and
   f) separating the desired polymer.

3. Synthesis of a catalyst system, for polymerization of monomers having at least one Ziegler-Natta polymerizable bond, comprising steps of:
   a) selecting a solid component comprising a magnesium dialkoxide of the general formula Mg(OR$^2$)$_2$ where R$^2$ is a hydrocarbyl or substituted hydrocarbyl of 1 to 20 carbon atoms;
   b) combining the solid component with a metallocene catalyst component-supplying agent, such that the molar ratio of said component comprising a magnesium dialkoxide to said metallocene catalyst component is within the range of about 1:1 to about 4:1;
   c) adding a halogenating agent;
   d) adding a Group 4 agent, which may optionally be the same as the halogenating agent; and
   e) adding an effective cocatalyst.

4. The process of claim 1 wherein the molar ratio of magnesium dialkoxide to metallocene component is about 3:1.

5. The catalyst system of claim 1 wherein said metallocene catalyst component comprises at least one ligand comprising a cyclopentadienyl ring structure.

6. The catalyst system of claim 5 wherein said effective cocatalyst comprises an aluminum compound.

7. The catalyst system of claim 6 wherein said transition metal component is of the general formula MR$^1_x$ where the metal, M, is a Group 4 metal, R$^1$ is halogen or hydrocarbyloxy, and x is the valence state of the metal M.

8. The catalyst system of claim 7 wherein said aluminum compound is an organoaluminum.

9. The catalyst system of claim 8 wherein said Group 4 metal is titanium.

10. The catalyst system of claim 9 wherein said organoaluminum is an aluminum alkyl of the formula AlR'$_3$ where R' is an alkyl having 1–8 carbon atoms, each R' being the same or different.

11. The process for polymerization of monomers of claim 2 wherein said metallocene catalyst component comprises at least one ligand comprising a cyclopentadienyl ring structure.

12. The process of polymerization of claim 11 wherein said effective cocatalyst comprises an aluminum compound.

13. The process of polymerization of claim 12 wherein said transition metal catalyst is of the general formula MR$^1_x$ where the metal, M, is a Group 4 metal, R$^1$ is halogen or hydrocarbyloxy, and x is the valence state of the metal M.

14. The process of polymerization of claim 13 wherein said aluminum compound is an organoaluminum.

15. The process of polymerization of claim 14 wherein said Group 4 metal is titanium.

16. The process of polymerization of claim 15 wherein organoaluminum is an aluminum alkyl of the formula AlR'$_3$ where R' is an alkyl having 1–8 carbon atoms, each R' is the same or different.

17. The synthesis of the catalyst system, for polymerization of monomers having at least one Ziegler-Natta polymerizable bond, of claim 3 wherein said metallocene catalyst component comprises at least one ligand comprising a cyclopentadienyl ring structure.

18. The synthesis of the catalyst system of claim 17 wherein said effective cocatalyst comprises an aluminum compound.

19. The synthesis of the catalyst system of claim 18 wherein said Group 4 agent is of the general formula MR$^1_x$ where the metal, M, is a Group 4 metal, R' is halogen or hydrocarbyloxy, and x is the valence state of the metal, M.

20. The synthesis of the catalyst system of claim 19 wherein said aluminum compound is an organoaluminum.

21. The synthesis of the catalyst system of claim 20 wherein said Group 4 metal is titanium.

22. The synthesis of the catalyst system of claim 21 wherein said organoaluminum is an aluminum alkyl of the formula AlR'$_3$ where R' is an alkyl having 1–8 carbon atoms, each R' being the same or different.

23. The catalyst system of claim 1 wherein the molar ratio of magnesium dialkoxide to metallocene component is within the range of about 2:1 to about 3:1.

24. The process of claim 2 wherein the molar ratio of magnesium dialkoxide to metallocene component is within the range of about 2:1 to about 3:1.

25. The process system of claim 2 wherein the molar ratio of magnesium dialkoxide to metallocene component is about 3:1.

26. The synthesis of claim 3 wherein the molar ratio of magnesium dialkoxide to metallocene component is within the range of about 2:1 to about 3:1.

27. The synthesis of claim 3 wherein the molar ratio of magnesium dialkoxide to metallocene component is about 3:1.

* * * * *